(12) United States Patent
Welschinger et al.

(10) Patent No.: US 10,837,455 B2
(45) Date of Patent: Nov. 17, 2020

(54) PUMP CASING FOR A CENTRIFUGAL PUMP AND CENTRIFUGAL PUMP

(71) Applicant: Sulzer Management AG, Winterthur (CH)

(72) Inventors: Thomas Welschinger, Radolfzell (DE); Nitin Ugale, Neftenbach (CH); Torsten Johne, Aadorf (CH)

(73) Assignee: SULZER MANAGEMENT AG, Winterthur (CH)

(*) Notice: Subject to any disclaimer, the term of this patent is extended or adjusted under 35 U.S.C. 154(b) by 62 days.

(21) Appl. No.: 16/000,203

(22) Filed: Jun. 5, 2018

(65) Prior Publication Data
US 2019/0010952 A1 Jan. 10, 2019

(30) Foreign Application Priority Data

Jul. 4, 2017 (EP) .................... 17179462

(51) Int. Cl.
*F04D 29/42* (2006.01)
*F04D 29/08* (2006.01)
(Continued)

(52) U.S. Cl.
CPC .............. *F04D 29/086* (2013.01); *F04D 1/00* (2013.01); *F04D 29/426* (2013.01); *F04D 29/628* (2013.01); *F16J 15/32* (2013.01)

(58) Field of Classification Search
CPC ........ F04D 29/086; F04D 1/00; F04D 29/426; F04D 29/628; F16J 15/32
See application file for complete search history.

(56) References Cited

U.S. PATENT DOCUMENTS

| 2,678,606 A | 5/1954 | Watson |
| 3,642,248 A | 2/1972 | Benware |

(Continued)

FOREIGN PATENT DOCUMENTS

| DE | 3513116 A1 | 10/1986 | |
| DE | 19921365 A1 * | 11/2000 | ................ F01P 5/10 |

(Continued)

OTHER PUBLICATIONS

Extended European Search Report dated Dec. 14, 2017 in corresponding European Patent Application No. 17179462.1, filed Jul. 4, 2017.

*Primary Examiner* — Aaron R Eastman
*Assistant Examiner* — Theodore C Ribadeneyra
(74) *Attorney, Agent, or Firm* — Global IP Counselors, LLP (57) ABSTRACT

A pump casing for a centrifugal pump has a first housing part, a second housing part sealingly attached to the first housing part, a plurality of securing elements for linking the first and the second housing part, and a radial sealing element for sealing between the first and the second housing parts, the first housing part has a first axial end surface, and the second housing part has a second axial end surface, the first and second axial end surfaces facing each other, and the first axial end surface includes an annular protrusion extending in the axial direction and the second axial end surface includes an annular recess configured for engaging with the annular protrusion, the annular protrusion arranged radially inwardly with respect to the securing elements.

15 Claims, 5 Drawing Sheets

(51) Int. Cl.
*F04D 29/62* (2006.01)
*F04D 1/00* (2006.01)
*F16J 15/32* (2016.01)

(56) References Cited

U.S. PATENT DOCUMENTS

| | | | | |
|---|---|---|---|---|
| 3,981,626 A * | 9/1976 | Onal | ............... | E21B 33/12 |
| | | | | 417/89 |
| 4,909,705 A * | 3/1990 | Katsura | ............... | F04D 1/063 |
| | | | | 277/411 |
| 5,846,052 A * | 12/1998 | Kameda | ............... | F04D 1/06 |
| | | | | 415/182.1 |
| 6,663,362 B1 | 12/2003 | Lentz et al. | | |
| 7,032,905 B2 * | 4/2006 | Mullally | ............... | F16J 15/024 |
| | | | | 277/626 |
| 7,980,311 B2 * | 7/2011 | Dowling | ............... | E21B 31/107 |
| | | | | 166/301 |
| 8,021,132 B2 * | 9/2011 | Green | ............... | E21B 43/128 |
| | | | | 417/360 |
| 9,556,879 B2 * | 1/2017 | Shinohara | ............... | F04D 17/12 |
| 2005/0079075 A1 * | 4/2005 | Dolson | ............... | F04D 13/06 |
| | | | | 417/423.14 |
| 2005/0249589 A1 * | 11/2005 | Ozawa | ............... | F04D 29/086 |
| | | | | 415/170.1 |
| 2008/0075586 A1 | 3/2008 | Fukuki et al. | | |
| 2009/0159262 A1 * | 6/2009 | Gay | ............... | E21B 43/128 |
| | | | | 166/105 |
| 2011/0116948 A1 * | 5/2011 | Yi | ............... | H02K 1/148 |
| | | | | 417/410.1 |
| 2012/0282119 A1 * | 11/2012 | Floyd | ............... | F04D 13/10 |
| | | | | 417/312 |
| 2013/0259720 A1 * | 10/2013 | Mills | ............... | F04D 29/5806 |
| | | | | 417/410.1 |
| 2014/0037434 A1 * | 2/2014 | Eslinger | ............... | F04D 13/10 |
| | | | | 415/168.2 |
| 2014/0178182 A1 * | 6/2014 | Huth | ............... | F04D 29/083 |
| | | | | 415/170.1 |
| 2015/0159669 A1 * | 6/2015 | Meuter | ............... | F04D 1/063 |
| | | | | 415/170.1 |
| 2015/0322966 A1 * | 11/2015 | Bratthall | ............... | F04D 13/06 |
| | | | | 417/423.8 |
| 2016/0084050 A1 * | 3/2016 | Mack | ............... | F04D 13/10 |
| | | | | 417/423.7 |
| 2017/0037861 A1 * | 2/2017 | Rutter | ............... | F04D 29/086 |
| 2017/0058915 A1 | 3/2017 | Liang et al. | | |

FOREIGN PATENT DOCUMENTS

| | | |
|---|---|---|
| DE | 19921365 A1 | 11/2000 |
| JP | S5641482 A | 4/1981 |
| JP | 2008025538 A | 2/2008 |
| WO | 9409274 A1 | 4/1994 |

* cited by examiner

PUMP CASING FOR A CENTRIFUGAL PUMP AND CENTRIFUGAL PUMP

CROSS-REFERENCE TO RELATED APPLICATION

This application claims priority to European Application No. 17179462.1, filed Jul. 4, 2017, the contents of which are hereby incorporated herein by reference.

BACKGROUND

Field of the Invention

The invention relates to a pump casing for a centrifugal pump and to a centrifugal pump.

Background of the Invention

The pump casing of a centrifugal pump typically comprises a plurality of housing parts that are secured to each other to form the pump casing. For example, in a barrel casing pump the housing parts comprise a barrel, in which the impeller(s) of the pump is/are arranged, and an end cover for closing the barrel with respect to the axial direction. The end cover is firmly secured to the barrel, usually by a plurality of bolts and nuts. A very important aspect regarding the operating reliability and the performance of the pump is the sealing between the individual housing parts. As an example, in a barrel casing pump the outlet pressure of the fluid that may be 1000 bar or even more is also acting upon the connection between the barrel and the end cover at the inside of the pump. At the outside of the pump there is in many cases ambient pressure, so that the sealing between the barrel and the end cover has to reliably seal a huge pressure difference.

Known sealing arrangements for the sealing between the housing parts are for example designed as radial sealing arrangements or axial sealing arrangements. In both sealing arrangements the sealing element for sealing between the adjacent housing parts are typically designed as ring-shaped or annular sealing elements and arranged coaxially with the shaft of the pump. In a radial sealing arrangement the sealing element is arranged in a curved surface, in particular in a surface having a surface normal vector directed in radial direction. The curved surface is e.g. concentric with the shaft of the pump. In an axial sealing arrangement the sealing element is arranged in a planar, i.e. non-curved, surface. Usually the surface has a surface normal vector directed in the axial direction. The axial direction is defined by the longitudinal axis of the shaft, i.e. the rotational axis about which the impeller(s) of the pump rotate(s) during operation.

Figure 1:
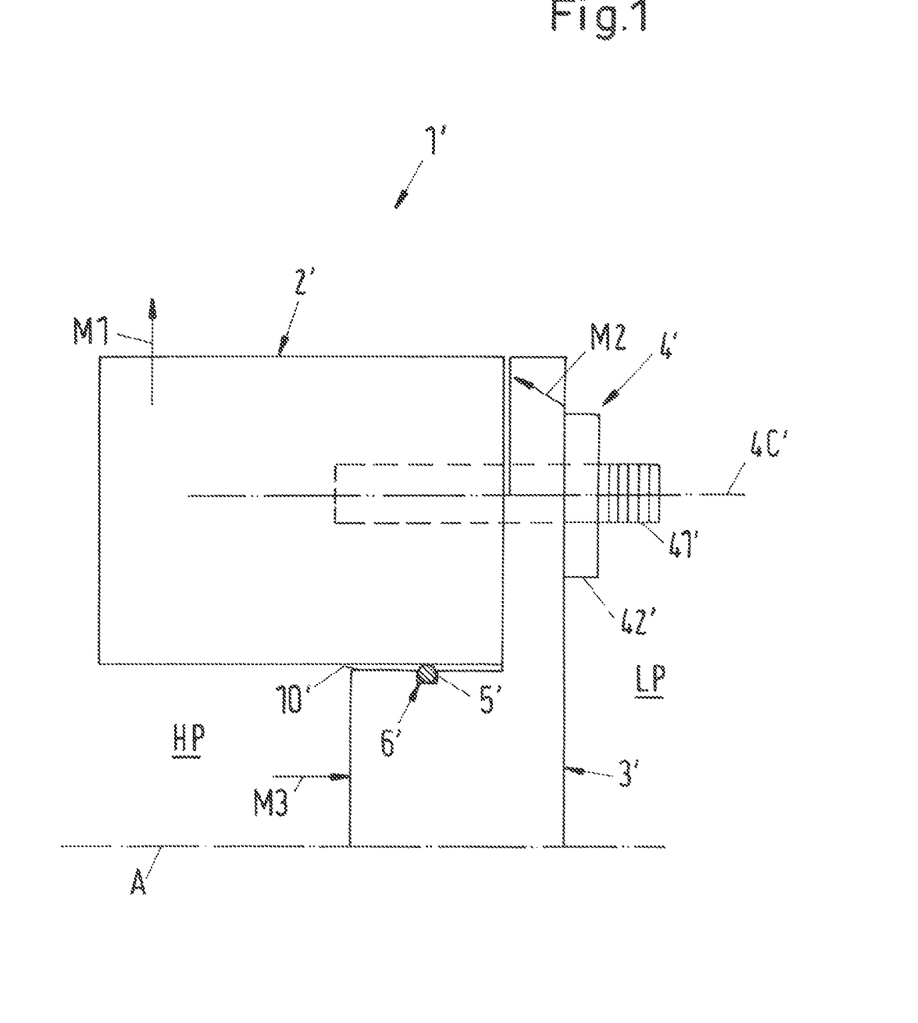
FIG. 1 is a schematic representation of a radial sealing arrangement for the sealing between a first housing part and a second housing part according to the prior art.

FIG. 1 is a schematic representation illustrating a known radial sealing arrangement for the sealing between a first housing part 2', for example a barrel of a barrel casing pump, and a second housing part 3', for example an end cover for closing the barrel with respect to the axial direction A. The axial direction defined by the longitudinal axis of the shaft (not shown) of the pump is indicated by the line with the reference numeral A. The first and the second housing part 2', 3' are firmly secured to each other by a plurality of securing elements 4', of which only one is shown in FIG. 1. The securing element 4' is for example a bolt 41' cooperating with a nut 42' in a known manner. The centerline of the bolt 41' is designated with reference numeral 4C'. Between the first and the second housing part 2', 3' a sealing gap 10' is formed which is ring-shaped and which is coaxially arranged with the shaft of the pump. The sealing gap 10' is sealingly closed by a radial sealing element 5', for example an self-sealing O-ring type seal, inserted in an annular sealing groove 6' disposed in the second housing part 3'. Both the sealing element 5' and the groove 6' completely surround the shaft of the pump in the circumferential direction. During operation of the pump, the interior of the pump is exposed to a very high pressure indicated by the reference numeral HP, whereas at the outside of the pump a considerably lower pressure indicated by the reference numeral LP exists. The low pressure LP may be ambient pressure and the high pressure may be for example 500 bar or even more. Typically the first and the second housing part 2', 3' have a different stiffness. In the example mentioned hereinbefore the barrel (first housing part 2') is usually the weaker part and the end cover (second housing part 3') is the stronger or stiffer part.

SUMMARY

This may result in the following problem. Due to the high pressure HP the first housing part 2' is expanding in radial direction as indicated by the arrow M1 in FIG. 1. Since the first housing part 2' is fixed with respect to the second housing part 3' the radial expansion of the first housing part 2' results in an opening or an enlargement, respectively, of the sealing gap 10' in particular at the high pressure side HP. This increase in the sealing gap 10' may lead to a failure of the seal. In addition and particularly for sealing arrangements with O-rings as sealing elements the danger exists with regard to the extrusion of the O-ring. This means that the O-ring is deformed on the application of pressure in such a way that a part of it is pressed into the gap 10' opening under pressure which can have the consequence of a damaging of the O ring and in this way a loss of the sealing effect.

Two additional effects tend to support the opening or the increase of the sealing gap 10'. Due to the radial expansion of the first housing part 2' and the rigid connection by the securing elements 4' the second housing part 3' may be bent towards the first housing part 2' as indicated by the arrow with reference numeral M2 in FIG. 1. Furthermore, the high pressure HP acting on the central part of the second housing part 3' as indicated by the arrow with reference numeral M3 in FIG. 1 supports the bending of the second housing part 3'. Both effects may increase the opening or the enlargement of the sealing gap 10' and thus additionally jeopardize the reliable sealing action of the sealing arrangement with the radial sealing element 5'.

An analogous problem may occur with sealing elements 5' that are not self-sealing but require a pretensioning such as metallic or graphite sealing elements. The functioning of these sealing elements is based upon the surface pressure with which the sealing element is pressed against one or more surface(s) belonging to one or more housing part(s) 2', 3'. The gasket factor of such arrangements defined by the ratio of the surface pressure to the pressure difference that has to be sealed usually should be considerably larger than one, for example five or even more. The different expansion or deformation of the housing parts 2', 3' as described hereinbefore may result in a considerable reduction of the surface pressure or even to an opening of the sealing gap so that a reliable sealing function is no longer ensured. In addition, it is also possible that the different deformations of the housing parts 2', 3' cause an uneven load of the sealing element 5', meaning that different parts of the sealing element 5' are exposed to different surface pressures. Depending on the geometry of the sealing element 5' this may result in bending or tilting or rotation of the sealing element 5' which jeopardizes a proper sealing function.

Problems very similar to these pressure induced problems which may arise when the pump is used for applications in which the fluid to be pumped has a very high temperature. Strong temperature gradients or temperature transients may cause different thermal expansions of the first and the second housing part 2', 3', respectively. These thermally induced effects may have the same result as it has been described hereinbefore for the pressure induced effects, namely the opening or the enlargement of the sealing gap 10' or the reduction of the surface pressure, respectively.

One example for such high temperature applications are so-called ebullator pumps. These are pumps which are used for fluidized bed processes or ebullated bed processes in the hydrocarbon processing industry. These processes serve, for example, to purify heavy hydrocarbons, e.g. heavy fuel oil, or to purify refinery residues or to break them down into more easily usable, more highly volatile hydrocarbons. This is frequently done by applying hydrogen to the heavy hydrocarbons, wherein the mixed components are swirled in a reactor and the heavy hydrocarbons are there broken down with the aid of catalysts. To circulate the process fluid, which typically mainly consists of heavy hydrocarbons, in an ebullated bed reactor or fluidized bed reactor, special pump drive units are used for which the name ebullating pump has become common. These ebullating pumps are as a rule provided directly at the reactor as circulation pumps for the process fluid and are configured for process reasons such that the pump is arranged above the drive with respect to the vertical. Ebullating pumps have to work as reliably as possible and over a long time period in permanent operation under extremely challenging conditions, because the process fluid is typically at a very high pressure for example, 200 bar or more and additionally has a very high temperature of more than 400° C., e.g. 460° C.

The high temperature of the process fluid causes strong thermal gradients as well as considerable temperature transients that may result—as explained before—in the opening or the enlargement of the sealing gap between housing parts that are sealed with radial sealing arrangements between the two housing parts.

The invention addresses these pressure and/or temperature induced problems. Starting from this state of the art it is therefore an object of the invention to propose a pump casing for a centrifugal pump having at least two housing parts and a radial sealing element for sealing between the housing parts, wherein the pressure and/or temperature induced opening or increasing of a sealing gap between the housing parts is at least considerably reduced. It is a further object of the invention to propose a centrifugal pump having such a pump casing.

The subject matter of the invention satisfying these objects is described herein.

Thus, according to the invention a pump casing for a centrifugal pump is proposed, the pump casing extending in an axial direction and having a first housing part, a second housing part for being sealingly attached to the first housing part, a plurality of securing elements for linking the first and the second housing part, and a radial sealing element for sealing between the first and the second housing part, wherein the first housing part has a first axial end surface, and the second housing part has a second axial end surface, said first and second axial end surfaces facing each other, and wherein the first axial end surface comprises an annular protrusion extending in the axial direction and the second axial end surface comprises an annular recess configured for engaging with the annular protrusion and providing an outside centering, wherein the annular protrusion is arranged radially inwardly with respect to the securing elements.

By providing the first axial end surface of the first housing part with the annular protrusion that engages with the annular recess provided in the second axial end surface of the second housing part, the opening or the increasing of a sealing gap between those two adjacent radial surfaces of the first and the second housing part, between which the radial sealing element is arranged, is effectively prevented or at least considerably reduced. This applies in particular even if pressure induced or temperature induced deformations of the first and the second housing part occur that are different for the first and the second housing parts, respectively.

The radial radial outer surface of the annular protrusion abuts a surface delimiting the annular recess so that a sealing gap cannot open or at least cannot open to such an extent that the function of the sealing element is jeopardized. Thus, the sealing function of the radial sealing element is reliably ensured also in such applications with high pressure and/or high temperature of the fluid to be pumped.

By the engagement of the annular protrusion with the annular recess an outside centering of the annular protrusion is achieved. The radial outer wall of the annular recess functions as an external line-up clamp acting upon the radial outer surface of the annular protrusion, therewith centering the annular protrusion from the outside—as seen in the radial direction. The second housing part encompasses the annular protrusion of the first axial end surface of the first housing part by the annular recess. Thus, with respect to the axial direction there is an overlap between the radial outer wall of the annular protrusion and the radial outer wall of the annular recess.

Furthermore, the engagement of the annular protrusion with the annular recess has a centering effect ensuring that the radial sealing element is always evenly loaded along the entire circumference of the sealing element. This centering effect is an outer or outside centering effect, meaning that the centering is achieved by the engagement of the radial outer wall of the annular protrusion and the radial outer wall of the annular recess, wherein the radial outer wall of the annular recess encompasses the radial outer wall of the annular protrusion around the radial outer surface of the annular protrusion. The outer or outside centering of the radial sealing element prevents or at least considerably reduces an opening of the sealing gap under pressure. In addition the outside centering ensures an even load of the sealing element, meaning that different parts of the sealing element are exposed to essentially the same surface pressures even upon large pressure differences over the sealing element. Bending or tilting or rotation of the sealing element is prevented therewith ensuring a proper sealing function.

According to preferred embodiments, the annular recess is designed such, that the radial outer wall of the annular recess extends beyond the radial sealing element when viewed in the axial direction, so that the annular recess surrounds the radial sealing element. In such embodiments the radial sealing element is located within the annular recess.

It is a preferred measure when the annular recess is configured as a ring-shaped groove.

It is another preferred measure that the sealing element is arranged in an annular sealing groove.

According to a first embodiment the annular sealing groove is arranged in the first housing part.

According to a second embodiment the annular sealing groove is arranged in the second housing part.

According to a third embodiment the sealing groove is commonly formed by the first and the second housing part.

Furthermore, it is preferred, that the protrusion forms a part of the radial inner surface of the first housing part.

In particular when the protrusion forms a part of the radial inner surface of the first housing part the sealing groove is preferably arranged in the protrusion.

According to a preferred configuration, the second housing part comprises an inner section extending into the first housing part such that the first housing part encloses the inner section of the second housing part, wherein the sealing element is arranged between the inner section of the second housing part and the first housing part.

According to a forth embodiment, the sealing element is arranged in the annular recess of the second housing part.

In particular with respect to the fourth embodiment, it is preferred that the sealing element is a conical sealing element having an essentially T-shaped cross-section. This means, that the sealing element has a generally T-shaped cross-section, wherein the transition region between the longer bar of the T and the shorter bar of the T as well as the bottom side of the shorter bar joining the longer bar of the T is configured to have a conical shape.

It is a further preferred measure, which is applicable to all embodiments, that an annular gap is formed between the first axial end surface and the second axial end surface in the region located radially outwardly of the securing elements. Thus, the first and the second axial end surfaces are only in contact with each other within that area that is radially outwardly delimited by the securing elements. By this measure the contact surface between the first and the second axial end surfaces is reduced. This has the advantage that the force required for realizing a desired tension is reduced.

Preferably the sealing element is made of a metallic material, or a plastic, or a rubber, or graphite.

In addition, according to the invention a centrifugal pump is proposed, which pump comprises a pump casing in accordance with the invention.

In view of important applications the centrifugal pump may be designed as a boiler feed pump, or as an ebullator pump for circulating a process fluid.

Further advantageous measures and embodiments of the invention will become apparent from the dependent claims.

BRIEF DESCRIPTION OF THE DRAWINGS

The invention will be explained in more detail hereinafter with reference to the drawings.

DETAILED DESCRIPTION OF THE EMBODIMENTS

FIG. 1 shows a schematic representation of a pump casing 1' according to the prior art with a radial sealing arrangement for the sealing between a first housing part 2' and a second housing part 3' of the pump casing 1'. Since FIG. 1 has already been explained hereinbefore in the description of the prior art no further explanations are necessary. In order to differentiate the prior art arrangement over the embodiments according to the invention, the components of the pump casing 1' representing prior art are designated in FIG. 1 with reference numerals having a prime (inverted comma) behind the respective reference numeral.

In the following description of embodiments of the invention reference is made by way of example to one important application, namely to a centrifugal pump that is designed as an ebullator pump for circulating a process fluid.

Figure 2:
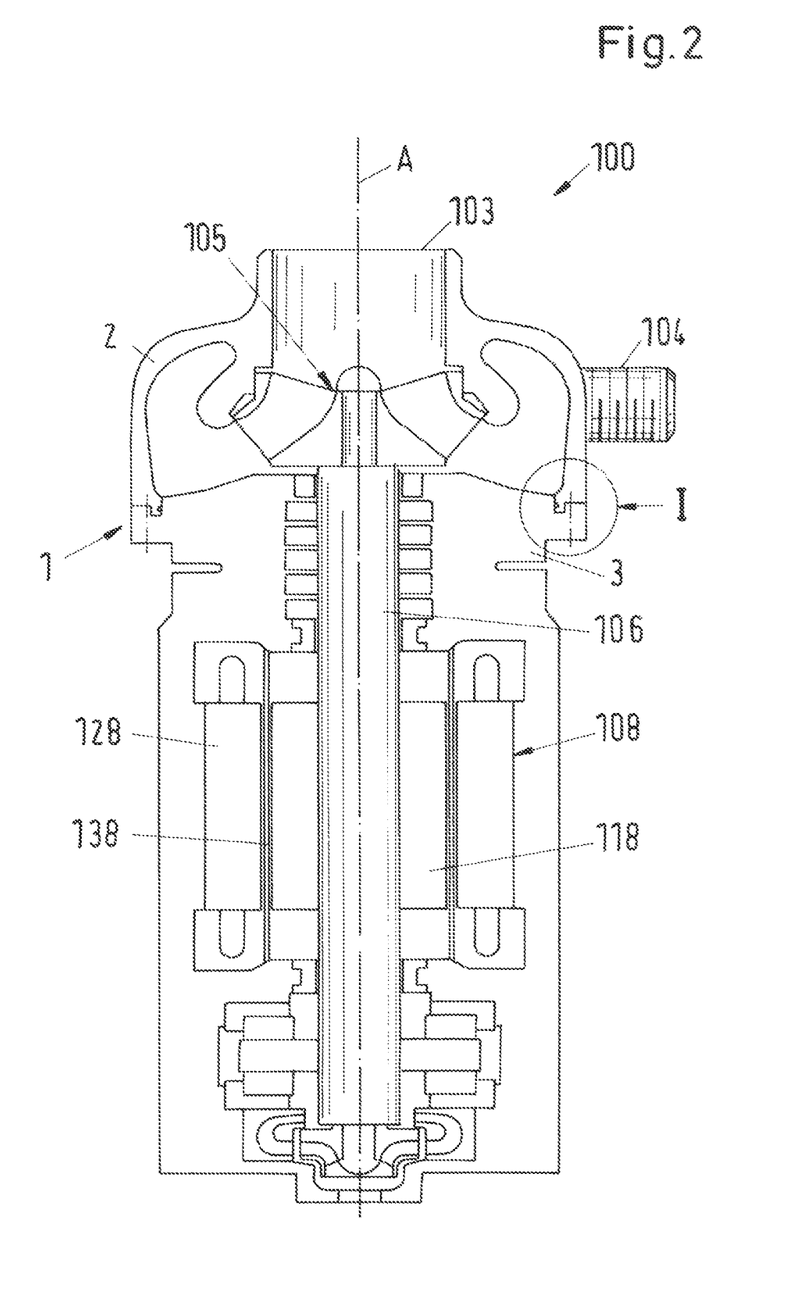
FIG. 2 is a cross-sectional view of an embodiment of a centrifugal pump according to the invention comprising a first embodiment of a pump casing according to the invention.
Figure 3:
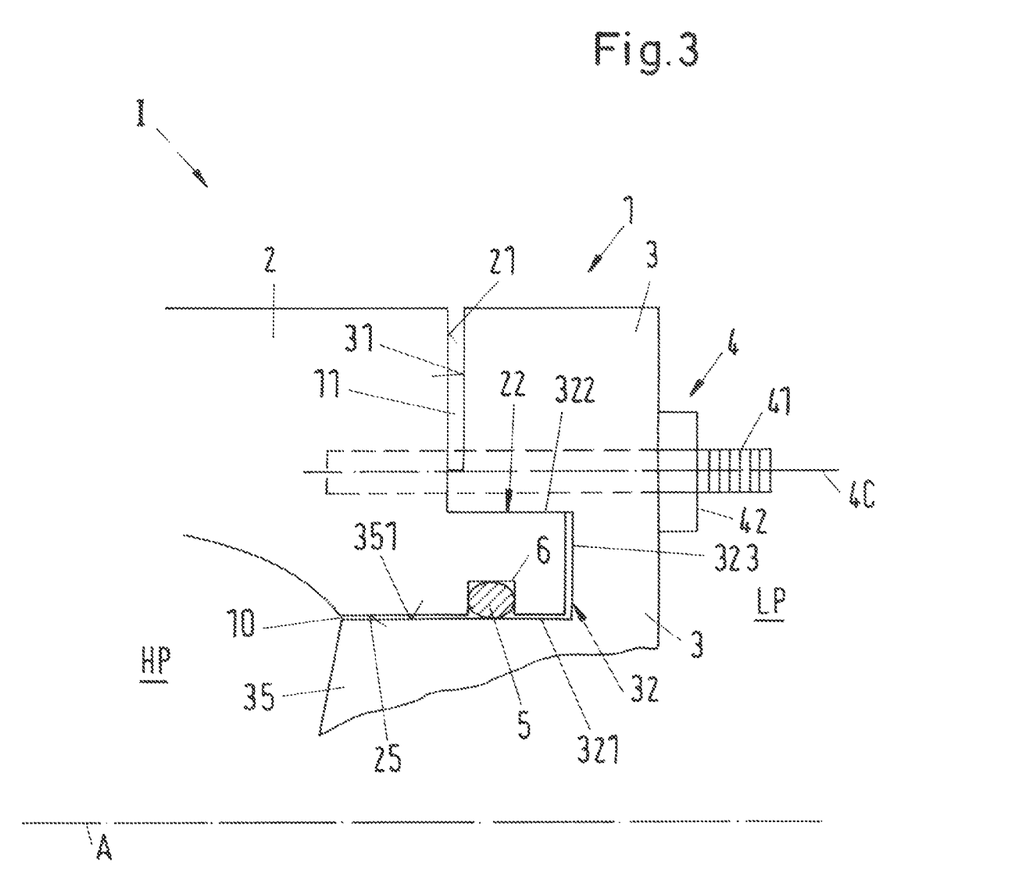
FIG. 3 is an enlarged view of detail I in FIG. 2 illustrating the first embodiment of the pump casing.

FIG. 2 shows a cross-sectional view of an embodiment of a centrifugal pump according to the invention which is designated in its entity with reference numeral 100. The centrifugal pump 100 comprises a first embodiment of a pump casing according to the invention which is designated in its entirety with reference numeral 1. In addition, FIG. 3 shows an enlarged view of detail I in FIG. 2 illustrating the first embodiment of the pump casing 1. The centrifugal pump 100 shown in FIG. 2 is designed as an ebullator pump 100 for circulating a process fluid.

It goes without saying that the invention is not restricted to this specific type of a centrifugal pump shown in FIG. 2 but is related to centrifugal pumps 100 in general. In particular, the invention is suited for centrifugal pumps 100 that are designed for conveying hot fluids of e.g. at least 200° C. or even more and/or for generating high pressures of e.g. up to 200 bar or 500 bar or 1000 bar or even more. By way of example the centrifugal pump 100 may be designed as a barrel casing pump, as a single or multistage pump, as a single or multiphase pump.

Firstly the ebullator pump 100 will be described referring to FIG. 2. As initially mentioned, ebullator pumps 100 are used for fluidized bed processes or ebullated bed processes in the hydrocarbon processing industry. These processes are used to purify, for example to desulfurize, heavy hydrocarbons which remain, for example, in the petroleum refinery in the bottom of the separation columns and/or to break them down into lighter hydrocarbons which can then be used more economically as distillates. Heavy oil which remains in the refining of petroleum can be named as an example for heavy hydrocarbons here. In a known process, the starting substance, that is the heavy hydrocarbons such as heavy oil, is heated, is mixed with hydrogen and is then supplied as process fluid into the fluidized bed reactor or ebullated bed reactor. The purification or breaking down of the process fluid then takes place in the reactor with the aid of catalysts which are held in suspension in the reactor to ensure a contact which is as intimate as possible with the process fluid. The ebullator pump 100 which is typically installed directly at the reactor is used for the supply of the reactor with the process fluid or for the circulation of the process fluid.

The ebullator pump 100 comprises the pump casing 1 having an inlet 103 and an outlet 104 for the process fluid to be conveyed. Inside the pump casing 1 an impeller 105 is provided for acting on the fluid. The impeller 105 is mounted on a shaft 106 for rotating the impeller 5 about an axial direction A. The axial direction A is defined by the longitudinal axis of the shaft 106, i.e. the rotational axis about which the impeller 105 of the pump 100 rotates during operation.

The pump casing 1 comprises a first housing part 2 and a second housing part 3 which are sealingly connected and fixed to each other by a plurality of securing elements 4 (FIG. 3). According to the representation in FIG. 2 the first housing part 2 is the upper housing part housing the impeller 105 and comprising both the inlet 103 and the outlet 104. The second housing part 3 is the lower housing part in FIG. 2 and houses a drive unit 108 for driving the shaft 106 and therewith rotating the impeller 105 about the axial direction A.

With respect to ebullator pumps 100 it is a common measure to integrate the drive unit 108 into the pump casing 1 in an analogous manner as submersible pumps are usually configured. Of course, the invention is not restricted to pumps with a drive unit integrated into the pump casing 1.

The drive unit 108 is preferably an electric motor and for example designed as a canned motor, comprising an inwardly disposed rotor 118 as well as an outwardly disposed stator 128 surrounding the rotor 118. A can 138 is disposed between the rotor 118 and the stator 128 and seals the stator 128 hermetically in a known manner with respect to the rotor 118. The rotor 118 is rotationally fixedly connected to the shaft 106 which extends in the axial direction A and which is connected, on the other hand, to the impeller 105 in a torque-proof manner.

FIG. 2 shows the ebullator pump 100 in its normal operating position. The pump 100 is configured as a vertical pump, i.e. with the shaft 106 extending in the vertical direction (direction of gravity). The inlet 103 is located at the top side of the pump 100 and the drive unit 108 is located below the impeller 105.

Since the process fluid pumped by the ebullator pump is at a very high pressure of, for example, at least 200 bar and at a very high temperature of, for example, more than 400° C. due to the process, the ebullator pump 100 also has to be designed for such pressures and temperatures. In this respect, the pump casing 1 of the ebullator pump 100, which also encloses the drive unit 108, is designed as a pressure casing which can safely withstand these high operating pressure of, for example, 200 bar or more. In addition, the ebullator pump is also designed such that it can convey the hot process fluid without risk. The process fluid usually has a temperature of more than 400° C.

As already mentioned, the axial direction A is defined by the longitudinal axis of the shaft 106 of the pump 100. A direction perpendicular to the axial direction A is referred to as 'radial direction'. The term 'axial' or 'axially' is used with the common meaning 'in axial direction' or 'with respect to the axial direction'. In an analogous manner the term 'radial' or 'radially' is used with the common meaning 'in radial direction' or 'with respect to the radial direction'. With respect to a surface the term 'axial' or 'radial' designates the direction of the surface normal vector of the surface. E.g. an axial surface is a surface having a surface normal vector directed in the axial direction A.

Referring particularly to FIG. 3, the first embodiment of the pump casing 1 will now be explained in more detail. The pump casing 1 comprises the first housing part 2 and the second housing part 3, which are sealingly attached to each other by the securing elements 4. A radial sealing element 5 is disposed between the first housing part 2 and the second housing part 3 for sealing between the first and the second housing parts 2, 3. The radial sealing element 5 is preferably designed as a ring-shaped sealing element 5. The sealing element 5 in FIG. 3 is for example a self-sealing O-ring seal.

The term "radial sealing element" designates a sealing element that is configured and arranged to function as a radial seal. As commonly used in the art a radial seal is a sealing arrangement having a sealing element that is arranged in or on a curved surface. In particular the curved surface is a radial surface, i.e. a surface having a surface normal vector that is directed in radial direction. Usually the sealing element 5 of a radial seal is arranged in or on a curved surface that encloses the shaft 106 of the pump 100. The radial sealing element 5 is ring-shaped and preferably arranged concentrically with the shaft 106.

In a section perpendicular to the circumferential direction of the sealing element 5, the sealing element 5 may have a circular cross-sectional area, or an oval, or a rectangular, or a D-Shape, or a T-Shape or any other cross-sectional area that is known in the art for ring-shaped sealing elements 5.

The sealing element 5 may be made for example of a metal or a metallic material or a plastic or a rubber or graphite.

The first housing part 2 has a first axial end surface 21 and the second housing part 3 has a second axial end surface 31. The first and the second axial end surfaces 21, 31 are facing each other.

The second housing part 3 comprises an inner section 35 located radially inwardly with respect to the second axial end surface 31. The inner section 35 extends into the first housing part 2 such that the first housing part 2 encloses the inner section 35 of the second housing part 3. The inner section 35 is delimited with respect to the radial direction by a radial outer surface 351 facing a radial inner surface 25 of the first housing part 2. The radial inner surface 25 delimits the first housing part 2 in radial direction.

The radial sealing element 5 is arranged between the radial outer surface 351 of the inner section 35 of the second housing part 3 and the radial inner surface 25 of the first housing part 2. The radial inner surface 25 of the first housing part 2 includes an annular sealing groove 6 extending along the entire inner circumference of the first housing part 2. The radial sealing element 5 is inserted into the annular sealing groove 6 and seals between the first and the second housing parts 2, 3.

The area between the radial inner surface 25 of the first housing part 1 and the radial outer surface 351 of the inner section 35 of the second housing part 3 where the first and the second housing parts 2, 3 overlap with respect to the axial direction A is referred to as sealing gap 10, because in this area the sealing element 5 is located for sealing between the first and the second housing parts 2, 3.

More generally the sealing gap 10 designates the separation between those adjacent surfaces of the first housing part 2 and the second housing part 3, in or on which the sealing element 5 is arranged.

Usually, the sealing gap 10 has a very small extension in the radial direction, which does not exceed the required clearance for inserting the inner section 35 of the second housing part 3 into the first housing part 2.

It is also possible that the sealing gap 10 is completely closed after the mounting when the first and the seconded housing parts 2, 3 are fixed to each other. In particular, in some embodiments where the sealing element 5 is not self-sealing but requires a pretensioning, for example when the sealing element 5 is made of a metallic material or graphite, the sealing gap 10 is usually completely closed after the first and the second housing parts 2, 3 are fixed to each other, so that the desired surface pressure between the sealing element and the housing part(s) is achieved.

Particularly referring to the first embodiment illustrated in FIG. 3 a closed sealing gap 10 means that the radial outer surface 351 and the inner surface 25 are in contact with each other. However, at least during the operation of the pump there is a considerable risk in the prior art arrangements that the sealing gap 10 opens or increases due to pressure and/or temperature induced deformations of the first and/or the second housing parts 2, 3 as it has been explained hereinbefore referring to FIG. 1. This opening or increasing of the sealing gap 10 under high pressure and/or under high temperature is avoided or at least considerably reduced in the pump casing 1 according to the invention as it will be explained in more detail later on.

The high pressure side located inside the pump casing 1 is designated with HP in FIG. 3 and the low pressure side is designated with LP. The low pressure LP is for example ambient pressure. In the ebullator pump 100 the high temperature side is the same side as the high pressure side HP and the low temperature side is the same side as the low pressure side LP.

In the mounted state of the pump casing 1 the first and the second axial end surface 21, 31 of the first and the second housing parts 2, 3, respectively, are in contact and pressed against each other by means of the securing elements 4. Preferably, each securing element 4 comprises a bolt 41 and a nut 42 that is screwed onto the bolt 41. Reference numeral 4C designates the centerline of the respective bolt 41. For linking the first and the second housing parts 2, 3 the bolts 41 are tensioned and fastened by the nuts 42 to generate the desired contact pressure, with which the first and the second housing parts 2, 3 are pressed together. Preferably the securing elements 4 are equidistantly arranged about the shaft 106.

Preferably, the first and the second axial end surfaces 21, 31 are not in contact over the entire respective surfaces 21, 31, but an annular gap 11 is formed between the first axial end surface 21 and the second axial end surface 31 in the region that is located radially outwardly of the securing elements 4. That is, with respect to the radial direction the annular gap 11 extends from an imaginary circle on which all the centerlines 4C of the bolts 41 are located to the radially outer rim of the first or the second housing parts 2, 3. In other words, the first and the second axial end surfaces 21, 31 are only in contact in an area that is located radially inwardly with respect to the centerlines 4C of the securing elements 4.

According to the invention the first axial end surface 21 comprises an annular protrusion 22 extending in the axial direction A and the second axial end surface 31 comprises an annular recess 32 configured for engaging with the annular protrusion 22 and for providing an outside centering, wherein the annular protrusion 22 is arranged radially inwardly with respect to the securing elements 4. By these features the opening or the increasing of the sealing gap 10 under high pressure and/or under high temperature is avoided or at least considerably reduced, because the interaction between the annular protrusion 22 and the annular recess 32 prevents the opening of the sealing gap 10 and functions as an outer centering.

In the first embodiment the annular recess 32 is configured as a ring-shaped groove 32. The ring-shaped groove 32 has an essentially rectangular profile in a cross-section perpendicular to the circumferential direction and is delimited by a radial outer wall 322, a radially inner wall 321 and an axial bottom wall 323 extending between the radially inner wall 321 and the radial outer wall 322. In the mounted state the ring-shaped groove 32 encloses the shaft 106 of the pump 100. The ring-shaped groove 32 is arranged adjacent to and concentrically with the inner section 35 of the second housing part 3, such that the radially inner wall 321 is aligned with or forms an integral part of the radial outer surface 351 of the inner section 35 of the second housing part 2.

It is also possible to arrange the ring-shaped groove 32 further outwardly with respect to the radial direction, i.e. closer to the securing elements 4, but in any case the ring-shaped groove 32 is located radially inwardly with respect to the securing elements 4.

The annular protrusion 22 at the first axial end face 21 of the first housing part 2 extends along the entire inner circumference of the first housing part 2 and has an essentially rectangular profile in cross-section perpendicular to the circumferential direction. The protrusion 22 is located at the radially inner rim of the first housing part 2, so that the protrusion 22 forms a part of the radial inner surface 25 of the first housing part 2. The annular protrusion 22 is aligned with the ring-shaped groove 32 and configured such that it fits into the ring-shaped groove 32. Preferably the annular protrusion 22 and the ring-shaped groove 32 are designed for a clearance fit.

The radial sealing groove 6, into which the sealing element 5 is inserted, is arranged in the annular protrusion 22.

In the mounted state the annular protrusion 22 engages the ring-shaped groove 32. This engagement results in an advantageous outer centering of the radial seal. Furthermore, the coaction of the protrusion 22 and the groove 32 ensures that the sealing element 5 and the entire sealing arrangement are always evenly loaded, particularly with respect to the circumferential direction.

In particular, upon pressure or temperature induced deformations, for example a radial expansion of the first housing part 2, the engagement of the protrusion 22 with the groove 32 prevents or at least considerably reduces the opening or the increase of the sealing gap, thus ensuring a reliable and safe sealing action. Since the protrusion 22 abuts the radial outer wall 322 of the ring-shaped groove 32 even a deformation of the first housing part 2 will not result in a significant opening or increase of the sealing gap 10.

The engagement of the protrusion 22 and the groove 32 has an additional positive effect with respect to openings in the pump casing 1 that are arranged near the boundary between the first and the second housing parts 2, 3. As an example reference is made to the outlet 104 (FIG. 1) disposed in the first housing part 2 and arranged near the contact area of the first and the second housing parts 2, 3. The outlet 104 has to include an opening in the wall of the first housing part 2 for discharging the fluid. From the mechanical point of view the opening of the outlet 104 constitutes a weak spot in the first housing part 2. In the prior art arrangements the pressure or temperature induced expansion or deformation of the first housing part may result in a deformation of the opening, for example an originally circular opening may be deformed to become oval or of any other shape. This may have a negative impact, for example to the connection of the outlet 104 with a piping.

The design according to the invention with the protrusion 22 engaging with the groove 32 prevents or at least considerably reduces such deformations of openings that are located near the contact area of the first and the second housing parts 2, 3 and therewith also ensures an even load of the sealing element 5 with respect to the circumferential direction.

The outer or outside centering of the annular protrusion 22 and the sealing element 5, respectively, is achieved by the radial outer wall 322 of the groove 32 acting upon the radial outer wall of the protrusion 22.

In the following description of further embodiments of the pump casing 1 according to the invention only the differences to the first embodiment are explained in more detail. The explanations with respect to the first embodiment are also valid in the same way or in analogously the same way for the other embodiments. the same reference numerals designate the same features that have been explained with reference to FIG. 2 and FIG. 3 or functionally equivalent features. Of course, it is also possible to combine specific features of the different embodiments.

Figure 4:
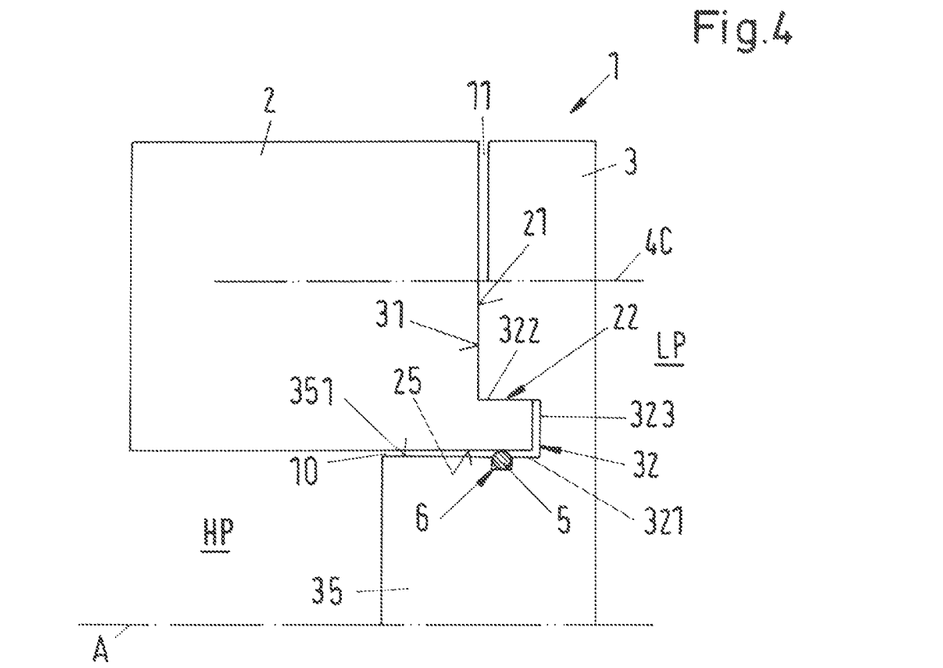
FIG. 4 is a schematic representation of a second embodiment of a pump casing according to the invention.

FIG. 4 shows a schematic representation of a second embodiment of a pump casing 1 according to the invention. In FIG. 4 the securing elements 4 are not shown in detail, but only represented by the centerline 4C of the bolt 41. In the second embodiment of the pump casing 1 the annular sealing groove 6 for receiving the radial sealing element 5 is arranged in the second housing part 3. More precisely, the annular sealing groove 6 is disposed in the radial outer surface 351 of the inner section 35 of the second housing part 3 and facing the annular protrusion 22 of the first housing part 2.

As a variant to the first or the second embodiment, respectively, it is also possible to provide both the radial outer surface 351 of the inner section 35 of the second housing part 3 and the radial inner surface 25 of the first housing part 1 with a respective circumferential groove, wherein both grooves face each other and commonly form the annular sealing groove 6 for receiving the radial sealing element 6.

Figure 5:
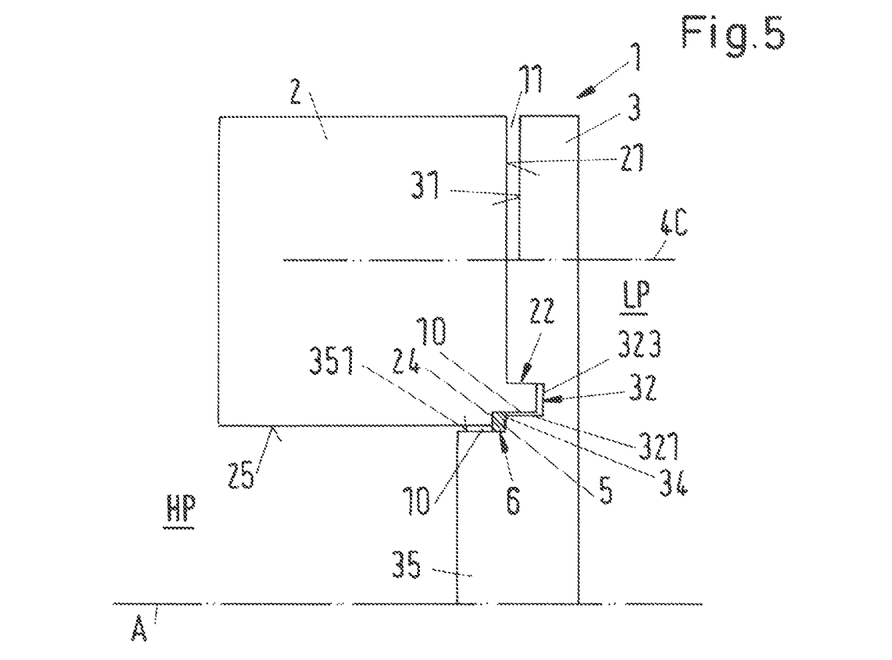
FIG. 5 is a schematic representation of a third embodiment of a pump casing according to the invention.

FIG. 5 shows a schematic representation of a third embodiment of a pump casing 1 according to the invention. In FIG. 5 the securing elements 4 are not shown in detail, but only represented by the centerline 4C of the bolt 41. In the third embodiment of the pump casing 1 the annular sealing groove 6 for receiving the radial sealing element 5 is commonly formed by the first and the second housing parts 2, 3.

The sealing element 5 is designed as a profile seal, also referred to as profile gasket, having a rectangular cross section and is made for example of graphite. This type of sealing element 5 usually requires a pretensioning to generate a surface pressure between the sealing element 5 and surfaces of the first and the second housing parts 2, 3 being in contact with the sealing element.

In the third embodiment, the annular protrusion 22 of the first axial end surface 21 of the first housing part 2 is not aligned with the radial inner surface 25 of the first housing part 1 but arranged further outwardly with respect to the radial direction, so that a shoulder 24 is formed between the annular protrusion 22 and the radial inner surface 25.

The annular recess 32 of the second axial end surface 31 of the second housing part 3 is arranged further outwardly with respect to the radial direction, so that the annular recess 32 is aligned with the annular protrusion 22. Therefore the radially inner wall 321 delimiting the annular recess 32 is not aligned with the radial outer surface 351 of the inner section 35 of the second housing part 3, but staggered with respect to the radial outer surface 351, so that the second axial end surface 31 includes an annular region 34, which is arranged between the annular recess 32 and the radial outer surface 351 of the inner section 35 with respect to the radial direction. Thus, the annular sealing groove 6 is delimited by the shoulder 24 and the annular region 34 with respect to the axial direction A. With respect to the radial direction the annular sealing groove 6 is delimited by the annular protrusion 22 and the radial outer surface 351 of the inner section 35 of the second housing part 3.

In the mounted state with the radial sealing element 5 inserted in the sealing groove 6 the sealing element 5 abuts both the annular protrusion 22 and the inner section 35 of the second housing part 3 with respect to the radial direction. In addition, the sealing element 5 abuts the annular region 34 of the second axial end surface 31 and the shoulder 24 with respect to the axial direction A.

The sealing gap 10 comprises a step at the sealing element 5. On the high pressure side HP of the sealing element 5 the sealing gap 10 is delimited with respect to the radial direction by the radial outer surface 351 of the inner section 35 of the second housing part 3 and by the radial inner surface 25 of the first housing part 2. On the low pressure side LP of the sealing element 5 the sealing gap 10 is delimited with respect to the radial direction by the radially inner wall 321 delimiting the annular recess 32 and by the protrusion 22. In such an arrangement as shown in FIG. 5 the more critical part of the sealing gap 10 is the one on the low pressure side LP of the sealing element 5. By the engagement of the protrusion 22 with the groove 32 an opening or a considerable increase of the sealing gap 10 in particular on the low pressure side LP of the sealing element 5 is reliably prevented.

Figure 6:
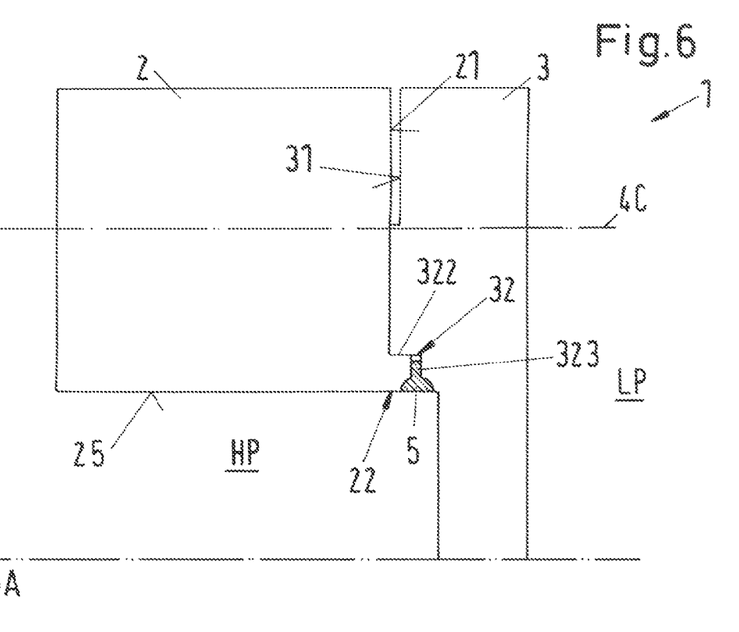
FIG. 6 is a schematic representation of a fourth embodiment of a pump casing according to the invention.
Figure 7:
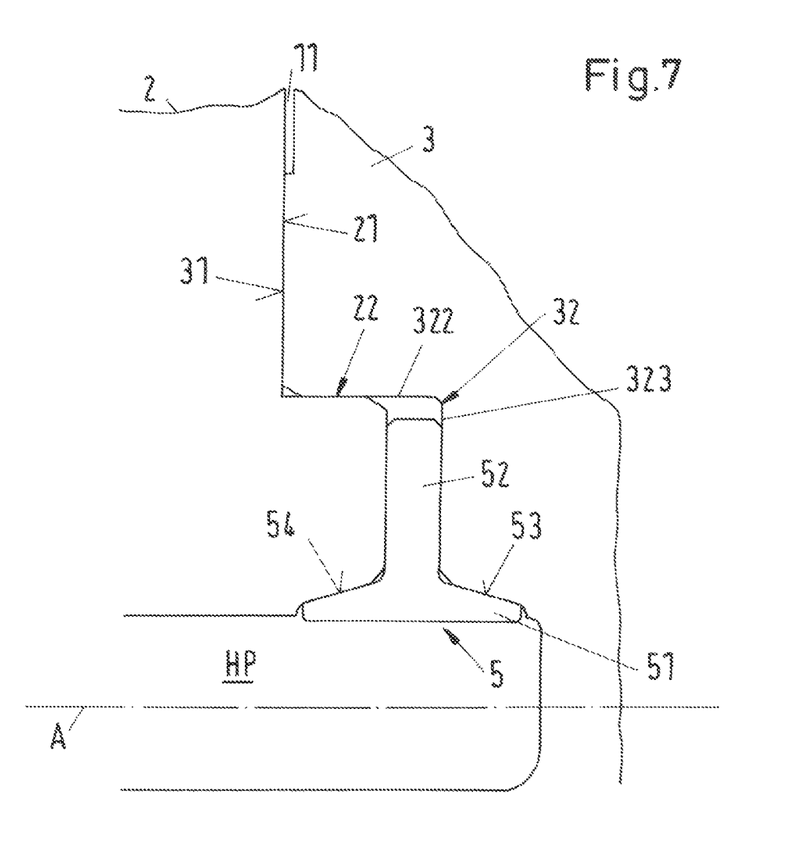
FIG. 7 is an enlarged view of the radial sealing element of the fourth embodiment.

FIG. 6 shows a schematic representation of a fourth embodiment of a pump casing 1 according to the invention. In FIG. 6 the securing elements 4 are not shown in detail, but only represented by the centerline 4C of the bolt 41. For a better understanding FIG. 7 shows an enlarged view of the radial sealing element 5 of the fourth embodiment.

Different from the first three embodiments the fourth embodiment does not comprise an inner section 35 (FIG. 2-5) extending into the first housing part 2. In addition, the annular recess 32 in the second axial end surface 31 of the second housing part 3 is open at the radially inner side, i.e. the annular recess 32 is only delimited by the radial outer wall 322 and by the axial bottom wall 323. But there is no radially inner wall like the radially inner wall 321 in the first, second and third embodiment.

The protrusion 22 is located at the radially inner rim of the first housing part 2, so that the protrusion 22 forms a part of the radial inner surface 25 of the first housing part 2.

The radial sealing element 5 is arranged in the annular recess 32 of the second housing part 3. In particular, the sealing element 5 is arranged between the protrusion 22 and the axial bottom wall 323 delimiting the annular recess 32 with respect to the axial direction A.

The radial sealing element 5 (see also FIG. 7) is designed as an annular sealing element 5 with an essentially T-shaped cross-sectional area perpendicular to the circumferential direction. The sealing element 5 comprises a ring-shaped axial leg 51 extending in the axial direction A and a ring-shaped radial leg 52 extending in radial direction, i.e. perpendicular to the axial leg 51. As can be best seen in FIG. 7 the axial leg 51 is configured to taper towards the radial leg 52 thus forming two conical surfaces 53, 54 that provide the most essential contribution to the sealing action. Due to the conical surfaces 53, 54 such sealing elements 5 are also referred to as conical sealing elements 5. The conical sealing element 5 is preferably made of a metal or a metallic material. The first conical surface 53 connects the axial leg 51 and the radial leg 52 of the sealing element 5 on the low pressure side LP, i.e. the first conical surface 53 contacts the second housing part 3 in the mounted state. The second conical surface 54 connects the axial leg 51 and the radial leg 52 on the high pressure side HP, i.e. the second conical surface 54 contacts the first housing part 2 in the mounted state. The overall shape of the conical sealing element 5 does not considerably change when the sealing element is pressurized. Thus, the general shape, in particular the cross-section, of the sealing element 5 shown in FIG. 7 is essentially the same prior to and after the mounting or the pressurizing of the sealing element 5.

Those areas of the protrusion 22 and the annular recess 32 that are in contact with the conical surfaces 53, 54 in the mounted state are adapted to receive the axial leg 51 of the sealing element 5, i.e. said areas are also configured in a tapering manner for forming a conical contact face abutting the first and the second conical surface 53, 54, respectively, of the sealing element 5.

The conical sealing element 5 usually requires a pretensioning to generate a surface pressure between the conical surface 53, 54 of the sealing element 5 and the conical contact faces of both the protrusion 22 and the annular recess 32 abutting the conical surface 53, 54 of the sealing element 5.

For a reliable sealing action the surface pressure between the second conical surface 54 and the first housing part 2 (here the conical contact face of the protrusion 22) should be at least essentially the same as the surface pressure between the first conical surface 53 and the second housing part 3 (here the conical contact face of the annular recess 32).

In prior art arrangements (as it has been explained with reference to FIG. 1) comprising such conical sealing elements the pressure and/or temperature induced deformations in particular of the first housing part 2' usually result in a decrease of the surface pressure in particular between the conical surface of the sealing element and the first housing part 2', whereas the surface pressure between the conical surface of the sealing element and the stiffer second housing part 3' remains essentially unchanged or even has the tendency to increase. Therefore, upon occurrence of deformations of the first housing part 2' the part of the conical surface of the sealing element contacting the second housing part 3' is subjected to a considerably stronger surface pressure than the part of the conical surface of the sealing element contacting the first housing part 2'. This difference in surface pressure has the detrimental effect that the sealing element is unevenly loaded which can result in a tilting of the sealing element or a bending or a rotation or a deformation. These effects may considerably jeopardize a reliably sealing function.

In the fourth embodiment of the pump casing 1 such negative effects are prevented or at least considerably reduced. By the interaction of the protrusion 22 and the annular recess 32, and in particular by the outside centering, it is ensured that the surface pressure between the second conical surface 54 and the first housing part 2 (here the conical contact face of the protrusion 22) is always at least approximately the same as the surface pressure between the first conical surface 53 and the second housing part 3 (here the conical contact face of the annular recess 32).

With respect to the radial direction, the radial leg 52 of the sealing element 5 does not extend to the radial outer wall 322 delimiting the annular recess 32. This has the advantage that the sealing element 5 and in particular the radial leg 52 may expand in radial direction, for example due to a high temperature, without abutting against the radial outer wall 322.

Regarding the axial direction A it is a preferred measure that the radial leg 52 of the sealing element 5 is not clamped between the annular protrusion 22 and the axial bottom wall 323 of the annular recess 32. Therefore the sealing element 5, the protrusion 22 and the recess 32 are configured in such a manner that a clearance exists both between the protrusion 22 and the radial leg 52 and between the axial bottom wall 323 of the annular recess 32 and the radial leg 52. In particular said clearance also exists in the mounted state when the first and the second housing part 2, 3 are pressed together.

The advantage of the clearance on both sides of the radial leg 52 is that the radial leg 52 can freely expand and contract in the radial direction. Thus, especially when the sealing element 5 and its adjacent components are exposed to high temperatures, strong temperature gradients or temperature transients the sealing element 5, in particular the radial leg 52, can change its extension in radial direction without being clamped in axial direction A between the protrusion 22 and the axial bottom wall 323 of the annular recess 32. Therefore, by providing the clearance in axial direction A the so-called slip stick effect can be avoided. In addition, the clearance ensures that the sealing element 5 is always self-centered, evenly loaded and prevented from tilting or rotating. The clearance is for example between 0.1 and 0.2 mm on each side of the radial leg 52 of the sealing element, preferably approximately 0.15 mm.

Even though the invention has been described referring to the specific embodiment of a pump designed as an ebullator pump it goes without saying, that the invention is not restricted to this type of pumps but is applicable to all other types of pumps.

As an example, in case the centrifugal pump 100 is configured as a barrel casing pump the first housing part 2 of the pump casing 1 is the barrel casing, in which the impeller or the impellers is/are arranged, and the second housing part 3 is the end cover, which closes the casing in axial direction.

The invention claimed is:

1. A pump casing for a centrifugal pump, the pump casing extending in an axial direction and comprising:
    a first housing part;
    a second housing part configured to be sealingly attached to the first housing part;
    a plurality of securing elements configured to link the first and the second housing parts; and
    a radial sealing element configured to seal between the first and the second housing parts, the first housing part having a first axial end surface and a radially inner surface, and the second housing part having a second axial end surface, the first and second axial end surfaces facing each other, the first axial end surface comprises an annular protrusion extending in the axial direction and the second axial end surface comprises an annular recess configured to engage the annular protrusion and provide an outside centering, and the annular protrusion being arranged radially inwardly with respect to the securing elements, the sealing element arranged at the radially inner surface.

2. The pump casing in accordance with claim 1, wherein the annular recess is a ring-shaped groove.

3. The pump casing in accordance with claim 1, wherein the sealing element is arranged in an annular sealing groove.

4. The pump casing in accordance with claim 3, wherein the annular sealing groove is arranged in the first housing part.

5. The pump casing in accordance with claim 3, wherein the annular sealing groove is arranged in the second housing part.

6. The pump casing in accordance with claim 3, wherein the sealing groove is formed by the first and the second housing parts.

7. The pump casing in accordance with claim 1, wherein the protrusion forms a part of the radial inner surface of the first housing part.

8. The pump casing in accordance with claim 7, wherein an annular sealing groove is arranged in the protrusion.

9. The pump casing in accordance with claim 1, wherein the second housing part comprises an inner section extending into the first housing part such that the first housing part encloses the inner section of the second housing part, and the sealing element is arranged between the inner section of the second housing part and the first housing part.

10. The pump casing in accordance with claim 1, wherein the sealing element is arranged in the annular recess of the second housing part.

11. The pump casing in accordance with claim 10, wherein the sealing element is conical and has an essentially T-shaped cross-section.

12. The pump casing in accordance with claim 1, wherein the sealing element is made of a metallic material, or a plastic, or a rubber, or graphite.

13. A centrifugal pump, comprising: the pump casing according to claim 1.

14. The centrifugal pump in accordance with claim 13, wherein the pump is a boiler feed pump, or an ebullator pump for circulating a process fluid.

15. A pump casing for a centrifugal pump, the pump casing extending in an axial direction and comprising:
a first housing part;
a second housing part configured to be sealingly attached to the first housing part;
a plurality of securing elements configured to link the first and the second housing parts;
a radial sealing element configured to seal between the first and the second housing parts, the first housing part having a first axial end surface, and the second housing part having a second axial end surface, the first and second axial end surfaces facing each other, the first axial end surface comprises an annular protrusion extending in the axial direction and the second axial end surface comprises an annular recess configured to engage the annular protrusion and provide an outside centering, and the annular protrusion being arranged radially inwardly with respect to the securing elements; and
an annular gap formed between the first axial end surface and the second axial end surface in a region located radially outwardly of the securing elements.

* * * * *